May 16, 1967 P. F. CROSBY ET AL 3,319,766
VERTICAL SELECTIVE CONVEYOR

Filed Nov. 10, 1965 7 Sheets-Sheet 1

FIG. 1

INVENTORS.
PETER F. CROSBY.
FRASER A. HURD
BY D. Emmett Thompson
ATTORNEY.

INVENTORS.
PETER F. CROSBY.
FRASER A. HURD.
BY
D. Emmett Thompson
ATTORNEY.

FIG. 4

INVENTORS.
PETER F. CROSBY.
FRASER A. HURD.
BY D. Emmett Thompson
ATTORNEY.

May 16, 1967 P. F. CROSBY ET AL 3,319,766
VERTICAL SELECTIVE CONVEYOR
Filed Nov. 10, 1965 7 Sheets-Sheet 6

INVENTORS.
PETER F. CROSBY.
FRASER A. HURD.
BY
D. Emmett Thompson
ATTORNEY.

May 16, 1967  P. F. CROSBY ET AL  3,319,766
VERTICAL SELECTIVE CONVEYOR

Filed Nov. 10, 1965  7 Sheets-Sheet 7

INVENTORS.
PETER F. CROSBY.
FRASER A. HURD.
BY D. Emmett Thompson
ATTORNEY.

United States Patent Office 3,319,766
Patented May 16, 1967

3,319,766
VERTICAL SELECTIVE CONVEYOR
Peter F. Crosby, Cazenovia, and Fraser A. Hurd, Liverpool, N.Y., assignors, by mesne assignments, to Diebold Incorporated, Canton, Ohio, a corporation of Ohio
Filed Nov. 10, 1965, Ser. No. 507,113
8 Claims. (Cl. 198—38)

This invention relates to vertical conveyors employed in building structures for transferring articles from one floor to another. More particularly, it has to do with that type of vertical conveyor employing a pair of laterally spaced apart vertically disposed track structures. An endless chain is trained on sprockets journalled at the upper and lower ends of the track structures, with the upper run of the chain moving in juxtaposition to one track structure, and the down-run moving in juxtaposition to the second track structure. There are a series of carrier elements secured to the chain at uniformly spaced intervals. The carriers being guided by the track structures during the up and down movements.

Article supporting platforms are mounted at each floor level, and are automatically movable into and out of the path traveled by the carriers, the carriers moving with the up-run of the chain function to remove articles from a loading platform positioned in the path of movement of the carriers, and the same carriers, when moving with the down-run of the chain, function to deposit articles on the unloading platform moved into the path of the downwardly moving carriers. Control mechanism is provided for automatically moving a loading platform, bearing an article, into the carrier path for an empty carrier to pick up the article from the loading platform, and to cause an unloading platform at the station for which the article is destined to automatically move into the carrier path at that station for the removal of the article from the carrier.

Heretofore, such conveyor systems have been substantially, to a great extent, completely fabricated on the job at the time of installation which, together with the shipment of the individual pieces and components of the conveyor system, resulted in a high cost for the installed system.

Also, in such prior systems, the loading and unloading mechanisms at each floor station were separate structures, which resulted in the conveyor shaft occupying a substantial floor area. Because of present high building structure cost, the unproductive floor area of substantial magnitude has become more objectionable. These loading and unloading mechanisms were assembled and erected from parts shipped to the job. This field assembly and erection presented many problems, and resulted in an unreasonably high cost for the installed system.

This invention has as an object a vertical conveyor system of the general type referred to, embodying a structural arrangement by which the track or rail guide structure may be erected in the building at the time of its construction. Thereafter, when the building is completed, the loading and unloading mechanisms are installed as a completely fabricated unit, or module, only requiring attachment to the track structure by use of a few bolts. These modules are completely fabricated at the manufacturing plant, under an efficient manufacturing operation, resulting in a drastically lower cost, and with precision construction and much greater dependability.

The invention consists in the novel features and in the combinations and constructions hereinafter set forth and claimed.

In describing this invention, reference is had to the accompanying drawings in which like characters designate corresponding parts in all the views.

In the drawings—

Figure 8:
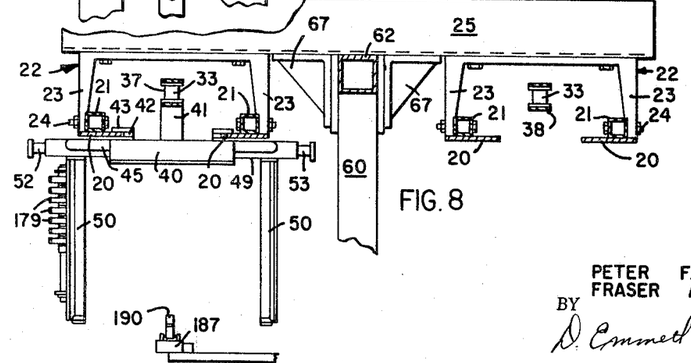
FIGURE 8 is a view taken on a line corresponding to line 8—8, FIGURE 7.

The conveyor system includes a pair of laterally spaced vertically disposed tracks, each track consisting of a pair of rails 20 formed of flat stock, and having square tubular members 21 welded to their rear or inner sides, see FIGURE 8. Each track is supported by U-shaped brackets 22. The free ends of the leg portions 23 of the brackets are bolted to the tubular members 21, by bolts 24. The brackets are bolted to angle pieces 25 fixed to the floor structure 27 at each floor level at the rear side of the conveyor shaft, and extending transversely of the shaft and serving to support both track structures. It will be apparent that the legs 23 of brackets 22, and the tubular members 21, effect the proper spacing between the rails 20.

Figure 1:
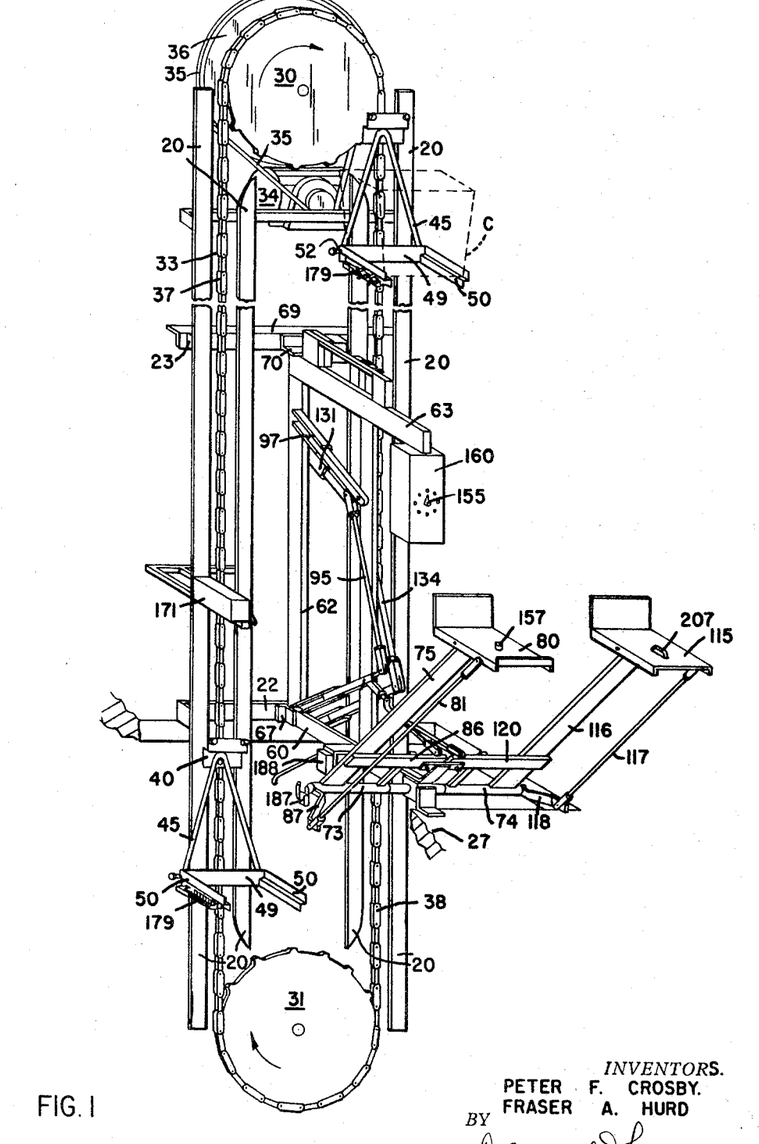
FIGURE 1 is an isometric view of a conveyor system embodying our invention and showing the loading and unloading unit for a floor station.

Referring to FIGURE 1, a sprocket 30 is journalled at the upper end of the conveyor structure, and a similar sprocket 31 is journalled at the lower end thereof. An endless chain 33 is trained about the sprockets 30, 31, and one of the sprockets, such as the upper sprocket 30, is driven by a motor 34 by belt 35 trained about the pulley 36 connected to the sprocket 30.

The sprockets 30, 31, are rotated in a clockwise direction, FIGURE 1, and the arrangement is such that the upper run 37 of the chain extends in a plane between the guide rails 20 at the left side of the conveyor, and the down-run 38 extends in a plane between the rails 20 at the right side of the machine. Article carriers are pivotally connected to the chain 33 at uniform intervals therealong. These carriers include an upper plate 40, the side margins of which have slidable engagement with the front sides of the rails 20. These plates are pivotally connected to the chain 33, see FIGURE 8, by members 41. A spacer 42 is mounted on the rear side of the plate 40, the spacer being comparable to the thickness of the rails 20. A plate 43 is positioned on the spacer 42 and has its side margins slidably engaging the rear sides of the rails 20.

The carriers further include an A-shaped rod structure 45, with the apex portion thereof attached to the plate 40, and the legs extending downwardly through an out-turned flange 47 on the plate 40. A cross member 49 is attached to the lower ends of the rod structure 45 and is provided with forwardly extending arms 50, Z-shaped in cross section, see FIGURES 7 and 8. Actuating lugs 52, 53, extend in a direction laterally from the arms 50. The lugs 52, 53, are formed on their outer ends with enlarged head portions 54. Spacers 55 are fixed to the rear side of the cross member 49 for sliding engagement of the inner edges of the rails 20, and a plate 56 is mounted on the spacers for overlapping the inner sides of the rails. With this arrangement, the carriers are accurately guided at their upper and lower ends in their movement along the rails.

The conveyor structure includes a loading and unloading unit, or module, mounted at each floor station. These units include a frame member vertically disposed medial of the up and down movements of the carriers. These frames include a lower member 60, a vertical member 61 extending upwardly from the lower member 60 substantially medial of the ends thereof, and a rear vertical member 62. There is an upper member 63 comparable to the lower member 60. All of these members are formed of tubular stock, rectangular in cross section, and are fixedly secured together.

Figure 2:
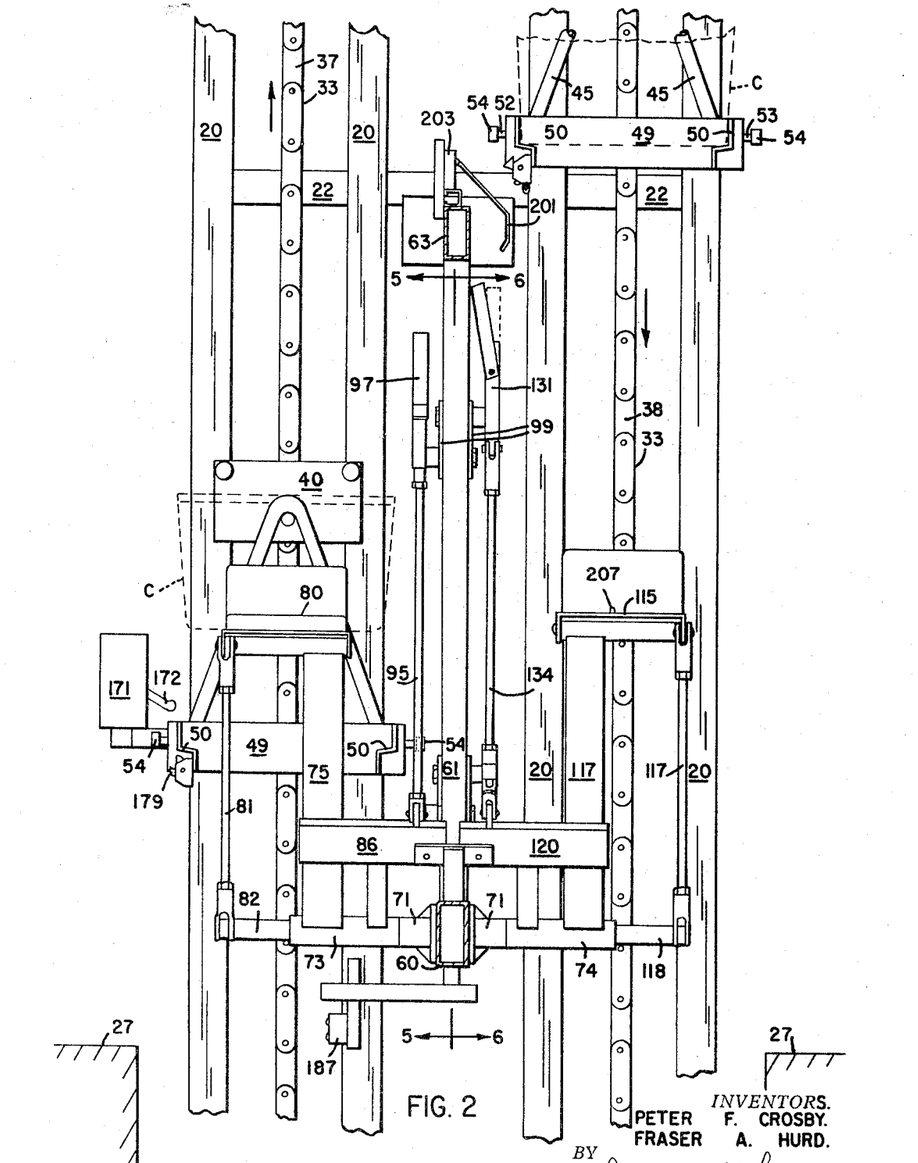
FIGURE 2 is a front elevational view of the conveyor system, including particularly the loading and unloading unit at a floor station.
Figure 3:
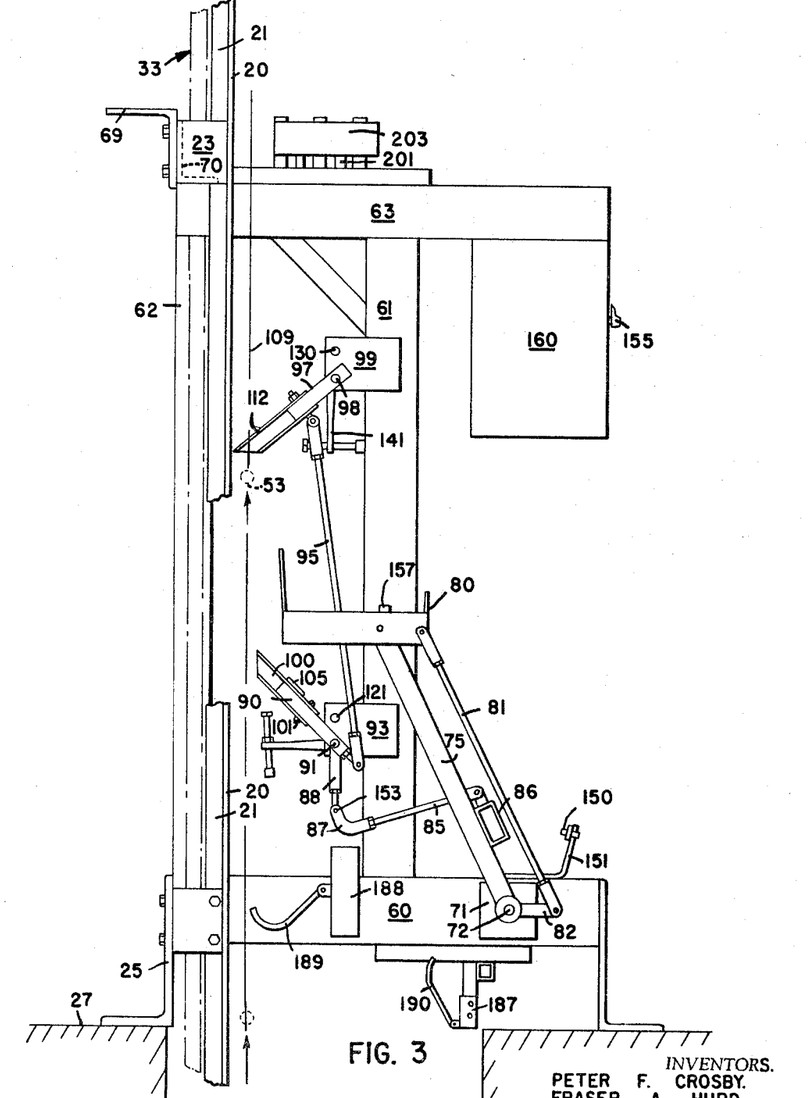
FIGURE 3 is a side elevational view, with parts broken away and looking to the right of FIGURE 2, illustrating the loading platform moved into the path traveled by the carriers.

The frame is attached at its inner end to the angle member 25 by means of angle pieces 67, see FIGURE 1, and also to an upper angle member 69 which is attached to upper rail brackets 22, the attachment of the frame to the angle member 69 being by way of an angle piece 70, see FIGURES 1 and 3. There is a loading mechanism mounted on the left side of the frame, see FIGURES 1 and 2, and an unloading mechanism mounted on the right side of the frame. There are supporting brackets 71, FIGURE 2, fixedly secured adjacent the forward end of the lower cross member 60. A shaft 72 is fixedly mounted in the bracket 71, and extends laterally from each side of the frame. Collars 73, 74, are journaled on the shaft 72. A pedestal 75 is fixedly secured to the collar 73.

A loading platform 80 is pivotally mounted intermediate its ends on the upper end of the pedestal 75. A balancing link 81 is pivotally connected at its upper end to the platform 80, and at its lower end to a bracket 82 fixedly mounted on the shaft 72 and extending forwardly therefrom. The hub portion of the bracket 82 provides a stop, or cap, for retaining the sleeve 73 on the shaft 72.

The loading platform 80 is normally in the out position, as shown in FIGURE 1. It is moved inwardly to the position shown in FIGURE 2, in which position it is arranged in the path traveled by the carriers, the width of the platform 80 being somewhat less than the distance between the carrier arms 50. When an article, such as a container indicated at C, is positioned on the platform 80 when in the out position, the platform is automatically moved inwardly and the article is lifted upwardly from the platform by the next empty carrier upwardly approaching the platform. This platform actuating mechanism is operated directly by the carriers.

Figure 5:
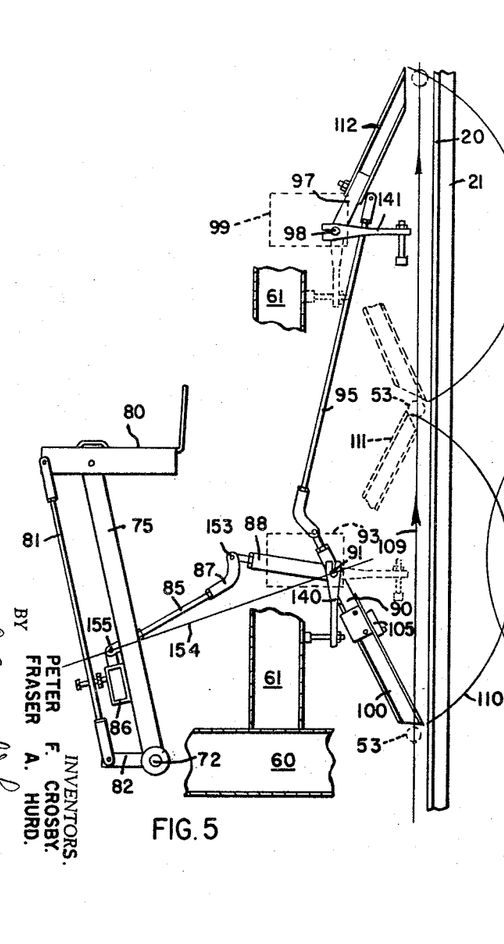
FIGURE 5 is a schematic view taken on a line corresponding to line 5—5, FIGURE 2, showing the load platform in out position, and the operating linkage connected thereto.

Referring particularly to FIGURES 3 and 5, a link 85 is pivotally connected at one end to a member 86 extending laterally from the pedestal 75 toward the frame structure. The opposite end of the link 85 is fixed to one leg of an angle clevis 87, the opposite leg of which is pivotally connected to an arm 88. The arm 87 is formed integral with, or fixedly secured to an actuator 90 fixed to a shaft 91 journalled in brackets 93, fixed on opposite sides of the vertical frame member 61.

A link 95 is pivotally connected at its lower end to the actuator 90, and at its upper end the link is pivotally connected to an actuator 97, which is fixed to a shaft 98 journaled in brackets 99, also secured on opposite sides of the frame column 61 in the upper portion thereof. The actuators 90, 97, normally diverge toward the plane of the rails 20, that is, the actuator 90 inclines downwardly and the actuator 97 inclines upwardly, see FIGURE 5.

Figures 7, 9, 10, 11:
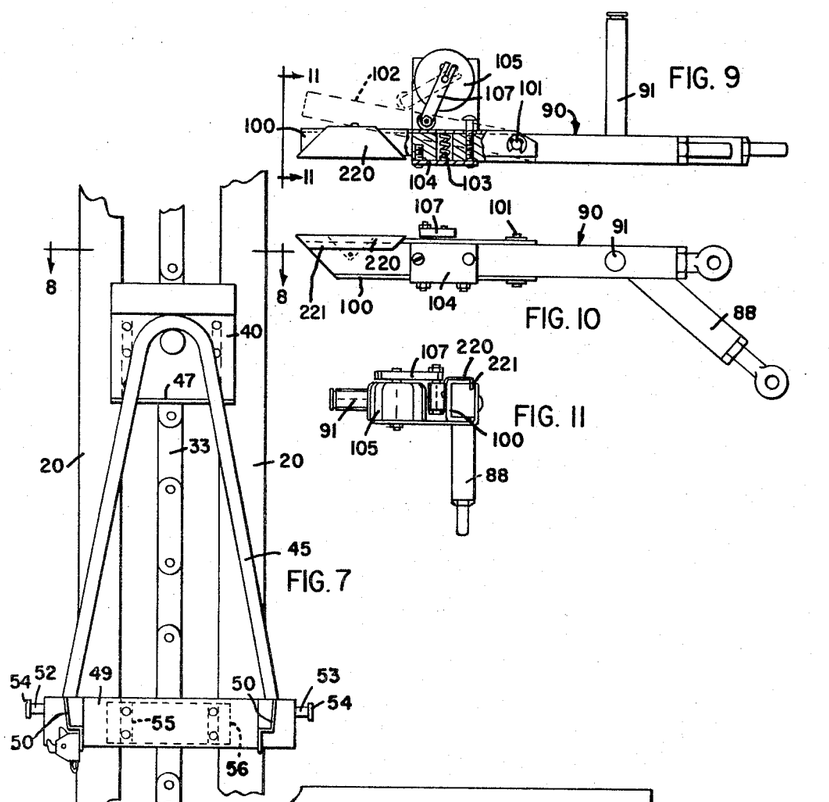
FIGURE 7 is an enlarged front elevational view of one of the carriers and contiguous portion of the chain and guide rails.
FIGURE 9 is a top plan view, with parts broken away and parts in section, of one of the platform actuators.
FIGURE 10 is a view looking upwardly in FIGURE 9.
FIGURE 11 is an end view of the actuators, the view being indicated by line 11—11, FIGURE 9.

The actuator 90 is provided with an end portion 100. The construction of the actuator 90 is shown in FIGURES 9, 10 and 11. The end portion 100 is of channel formation and is pivotally connected to the actuator on pin 101 and is urged to the dotted line position 102, FIGURE 9, by a compression spring 103 mounted in an aperture formed in the body of the actuator and retained by a plate 104, the opposite end of the spring 103 acting against the bottom of the end channel 100. A rotary solenoid 105 is attached to the actuator and, when energized, moves the arm 107 against the bottom wall of the end portion 100, swinging the end portion 100 to the full line position shown in FIGURE 9. In this position, the end channel 100 is located in the path of movement of the carrier lug 53 indicated by line 109, FIGURE 5, whereby the upwardly moving lug enters the channel 100 and, while traveling therealong, swings the actuator upwardly through the arc, indicated at 110, FIGURE 5, to the up position indicated at 111, this up position being shown in full line in FIGURE 3. This clockwise movement of the actuator 90 from the position shown in FIGURE 5 to the position shown in FIGURE 3, moves link 85 to the left and effects clockwise movement of the pedestal 75, FIGURE 5, about the axis of the shaft 72, causing movement of the load platform 80 from the out position, FIGURE 5, to the in position, as shown in FIGURE 3, whereby the arms 50 of the carrier can engage the ends of the container C and remove it from the load platform 80.

During this clockwise movement of the actuator 90, the tie rod 95 effects a clockwise movement of the actuator 97, moving the fixed channel end portion 112 thereof into the path of movement of the lug 53, FIGURE 3. The engagement of the lug 53 with the actuator 97 takes place after the container C has been elevated a distance above the platform 80. This engagement effects clockwise movement of the actuator 97, FIGURE 3, and counter-clockwise, FIGURE 5, by link 95, counter-clockwise movement of the actuator 90, FIGURE 3, and, through link 85, return movement of the platform 80 is brought about.

The unloading mechanism carried by the frame structure at the right side thereof involves basically the same arrangement as the loading mechanism. The unloading platform 115 is pivotally mounted on the upper end of the pedestal 116, fixedly secured to the right sleeve 74, FIGURE 2. The platform 115 is maintained in horizontal position by a balancing link 117 pivotally connected at its upper end to the platform 115, and at its lower end to an arm 118 fixed to the shaft 72.

The pedestal 116 is provided with a laterally extending member 120, similar to the member 86. A shaft 121 is journaled in the bearing plates 93 above the shaft 91. An actuator 123 is fixed to the shaft 121, and has a forwardly extending arm 125 pivotally connected to one leg of an angle clevis 127, which is similar to the clevis 87. The opposite leg of this clevis is connected to a tie link 128, the opposite end of which is pivotally connected to the member 120 fixed to the pedestal 116.

Figure 6:
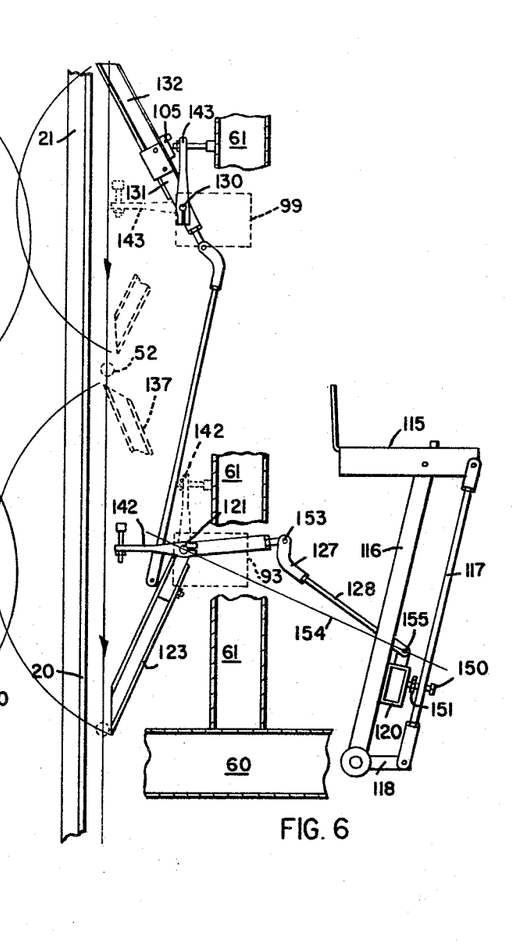
FIGURE 6 is a view, similar to FIGURE 5, taken on line 6—6, FIGURE 2.

A shaft 130 is journaled in the upper bearing plates 99 above the shaft 98 and has affixed at one end an actuator 131 having a movable channel end portion 132. The opposite end of the actuator 131 is pivotally connected to an angle clevis 133 which, in turn, is connected to a link 134, the opposite end of which is pivotally connected to the actuator 123, see FIGURES 4 and 6. In this unloading mechanism, the upper actuator 131 is provided with the movable end channel 132, similar to the channel 100 on actuator 90. Accordingly, when the solenoid 105 is energized, the end channel 132 is moved into the path of movement traveled by the lug 52 on a descending carrier. It will be obvious that the actuating lugs 53 extend laterally from the right side of the carriers, and the lugs 52 extend from the left side of the carriers looking at FIGURE 2. The use of the two lugs 52, 53, on each carrier permits the actuators to be mounted on the frame module, the lugs 53 moving in proximity to the frame on the up side of the conveyor system, and the lugs 52 moving contiguous to the frame on the down side of the conveyor system.

Figure 4:
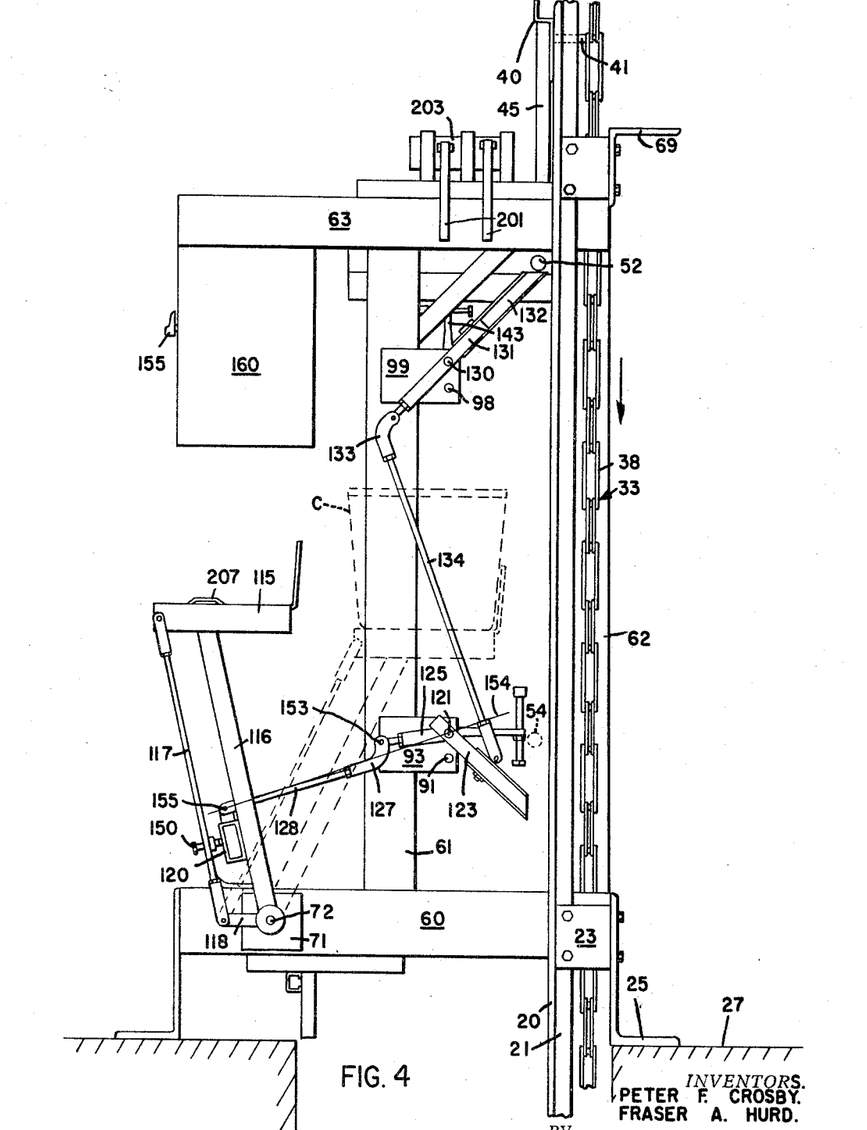
FIGURE 4 is a view, similar to FIGURE 3, looking to the left, FIGURE 2, showing the unloading side of the conveyor and with the loading platform shown in the out position.

As a lug 52 on a descending carrier moves into engagement with the channel end 132 of actuator 131, the actuator is moved in a clockwise direction, FIGURE 4, and through the instrumentality of link 134, effects movement in a counter-clockwise direction of the actuator 123. This movement results in moving the unloading platform 113 inwardly to receive a container C on the descending carrier. With the actuator 123 now moved to the up position, as shown at 137, FIGURE 6, the lug 52 on the descending carrier enters the channel formation on the actuator 123, moving it in a counter-clockwise direction, FIGURE 6, to the full line position shown in that figure and accordingly, effecting return of outward movement of the platform 115 and the container deposited thereon.

Each of the actuator pivot shafts 91, 98, 121 and 130, are provided with stop members fixedly secured thereto. A stop member 140 is fixed to the shaft 91. A stop member 141 is fixed to the shaft 98. A stop 142 is fixed to the shaft 121, and a stop 143 is fixed to the shaft 130. These stop members are employed to accurately determine the positioning of the platform actuators 90, 97, 123 and 131.

With the platform 80 of the load mechanism in the out position, as shown in FIGURE 5, the stop 140 is in engagement with the upright 61 of the frame. This results in positioning the movable channel end 100 so when the solenoid 105 is energized, this channel end will be moved into the path in which the lugs 53 on the carriers travel. When such engagement is made by an upwardly moving lug, and the upper actuator 97 is moved downwardly, the stop 141 engages the frame member 61 to accurately position the end of the actuator 97 for proper reception of the lug 53.

The same situation prevails at the unloading station, except in this instance, as previously explained, when the unloading platform is in out position, the actuator 131 is positioned by the stop 143 engaging the frame upright, so that when the solenoid 105 thereon is energized the channel end portion 132 will be properly moved into the path traveled by the lugs 52. When the arm 123 is moved to the up position, as indicated at 137, FIGURE 6, the stop 142 is moved into engagement with the vertical frame member 61. The outward position of the load and unload platforms is determined by the engagement of the members 86, 120, carried by the pedestals 75, 116, engaging stop screws 150 carried by a bracket 151 fixed to the bottom frame member 60.

With this arrangement described, the load and unload platforms are operated directly by the actuators and associated linkage by the actuating lugs carried by the carrier. Accordingly, the inward and outward movement of the load and unload platforms is in precise timed relation to the movement of the conveyor chain 33.

The angle clevis members 87, 127, result in the pivot point 153 of these clevises being located above the plane indicated by the lines 154 passing through the shafts 91, 121, and the pivot connections 155 between the outer ends of the links 85, 128, and the members 86, 120. The result is that when the platforms 80, 115, are in the out position, the clevises 87, 127, provide an over-the-center lock toggle, whereby the platforms 80, 115, cannot be manually pushed into the conveyor system.

The bracket 151 is formed to have some resiliency, and the stop screws 150 are adjusted so when the pedestals 75, 116 are in the out position the members 86, 120 engage the stop screws 150 prior to the stops 140, 143 engaging the vertical frame member 61. This results in placing the toggle clevises 87, 127 under compression to firmly maintain the loading and unloading units in the out position.

The conveyor system includes control mechanism for effecting proper operation of the loading and unloading platforms. The circuitry or the control mechanism is shown schematically in FIGURE 13.

Figure 13:
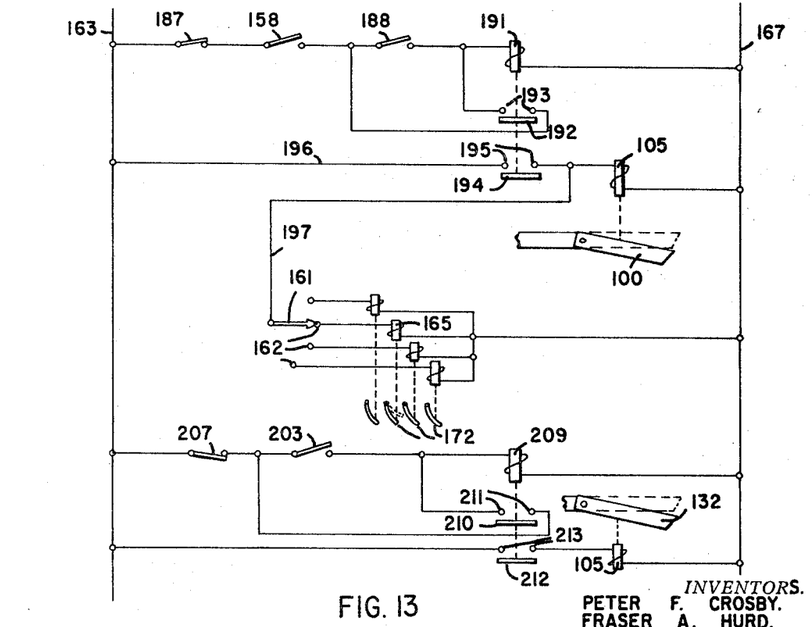
FIGURE 13 is a schematic wiring diagram of the control mechanism.

When it is desired to dispatch a container from a floor station for delivery to another floor station, a dial 155 is moved to the position corresponding to the floor at which the container is to be delivered. The container is then positioned on the load platform 80 engaging an actuator 157 of a switch 158. The dial is associated with a switching mechanism contained in a cabinet 160 mounted on the upper frame member 63 of the loading and unloading unit. In FIGURE 13, the switching mechanism is illustrated for simplicity as a movable contact 161, which is moved by adjustment of the dial, into engagement with one of a series of contacts 162, to establish a circuit from the supply side 163 to one of a series of solenoids, as 165, the opposite side of which is connected to the side 167 of the supply.

Figure 12:
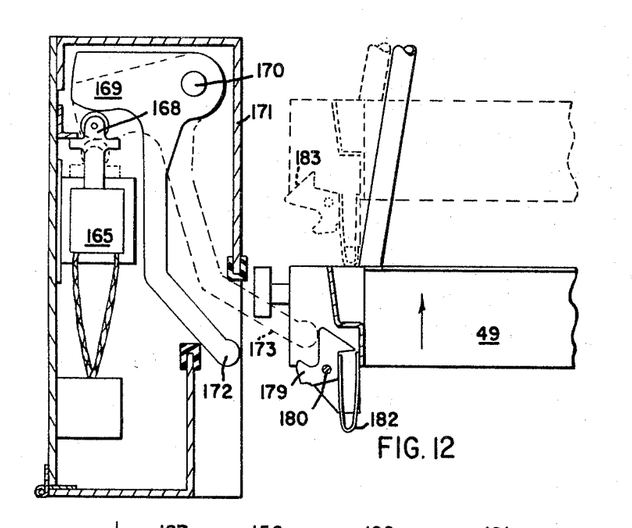
FIGURE 12 is an enlarged view of the tab setting mechanism and contiguous portion of a carrier, as shown at the left center of FIGURE 2.

Referring to FIGURE 12, one of the solenoids, as 165, is illustrated. The plunger 168 of solenoid 165 is normally maintained in up position, as shown in full line, by spring action, the plunger engaging the under side of a weighted portion 169 of an angle lever pivoted at 170 in the tab setter cabinet 171, FIGURE 1. When the solenoid 165 is energized, the plunger 168 is moved downwardly, permitting the weighted portion 169 to drop, and to swing the arm portion 172 of the angle lever outwardly to the dotted line position indicated at 173.

On the left end of each of the carrier bases 40, there are a row of tabs 179 pivotally mounted at 180. These tabs are maintained in the position shown in full line, FIGURE 12, by leaf springs 182. When the arm 172 is swung outwardly to the dotted line position by energization of the solenoid 165, a tab 179, engaged by the lower end of the arm 172 during upward movement of the carrier, is rotated in a counter-clockwise direction to the dotted line position shown at 183, FIGURE 12, in which position the tab extends laterally from the carrier. It will be understood that there are a series of tabs 179, and there are a like series of the solenoid operated arms 172. As previously stated, in the diagram FIGURE 13, for simplification, the switch arrangement is illustrated with only the one solenoid 165 being energized but, in practice, two or more of the solenoids are energized to set two or more of the tumblers 179, this arrangement obviously to provide for a greater number of floor stations serviced by the conveyor.

As a carrier in its upward movement approaches the station at which the loaded platform 80 is located, and it does not already have a container on it, a switch 187 remains closed. The location of this switch is illustrated in FIGURE 3. There is a switch 188 having an actuator 189 positioned slightly above the actuator 190 of switch 187, see FIGURES 1 and 3. The actuator 189 is engaged by a lug 53 on the carrier, and the switch 188 is moved to closed position.

The switch 187 is located so that the arms 50 of the carrier straddle the actuator 190, but the actuator is engaged by a container if one is present on the carrier. This engagement persists until after lug 53 engages actuator 189.

Referring again to FIGURE 13, if the switch 187 has not been actuated to open position, because of the absence of an article or container on the upwardly moving carrier, there is a circuit established from the side 163, through closed platform switch 158, closed switch 187, switch 188, closed by the carrier lug 53, to relay 191, the opposite side of which is connected to the side 167 of the supply. Energization of relay 191 moves its contact 192 into engagement with contact 193, these contacts being connected in shunt with switch 188 to form a hold circuit for relay 191.

Contact 194 of relay 191 is moved into engagement with contact 195 to establish a circuit from the side 163 through wire 196 to solenoid 105 to swing the end portion 100 of actuator 90 in position for engagement by the carrier lug 53 to effect inward movement of the loaded platform 80, as previously explained. Closed contacts 194, 195 also provide a circuit through wire 197 to contact 161 for energizing the solenoid 165 to swing the lever 172 outward, so that upon continued upward movement of the carrier the corresponding tab 179 will be swung to the out position, as shown at 183, FIGURE 12.

Actuation of the switch 188 by the carrier lug 53 is momentary. However, the relay 191 is held closed by the holding contacts 192, 193, to make certain the actuator 90 effects inward movement of the load platform 80. Immediately after the load platform 80 has been moved to its inward position, the arms 50 of the carrier engage the container, and move it upwardly from the platform 80. In doing so, switch 158 is opened breaking the hold circuit to the relay 191, and bringing about de-energization of the tab setting solenoid 165, and solenoid 105.

As the carrier continues upwardly, the lug 53 engages the channel end 112 of actuator 97, which at this time is positioned downwardly, as shown in FIGURE 3, causing it to be moved in a clockwise direction, to effect outward movement of the now empty platform 80, as previously explained.

As the carrier travels about the arc determined by the upper sprocket wheel 30 and descends in the right-hand track, FIGURE 1, the outwardly positioned tab 179 will engage the actuator 201 of switches 203, mounted on the upper frame member 63, closing the contacts of this switch.

If there is no article, or container, on the unload platform 115 at the floor station to which the container is destined, the contacts of switch 207 mounted in the unload platform 115 will be closed. Referring to FIGURE 13, a circuit will be completed from the side 163 through switches 207, 203, to relay 209 closing contacts 210, 211, which are connected in shunt with contacts 203 to provide a hold circuit for the relay 209. Contacts 212, 213 are closed to provide a circuit from the side 163 to solenoid 105 for actuating the movable end portion 132 of actuator 131 to position it for engagement by the lug 52 on the carrier. This will effect clockwise movement of the actuator 131 from the position shown in FIGURE 4 to the dotted position 215, shown in FIGURE 6, and accordingly, effecting inward movement of the empty unload platform 115 for the reception of the container C. As the container is deposited on the platform 115, contacts of switch 207 are opened de-energizing the relay 209. The lug 52 then enters the end channel portion of the actuator 123, which is now positioned upwardly, as indicated at 137, FIGURE 6. This engagement effects counter-clockwise movement of the actuator 123 to return the platform 115 with the container C thereon to the out position, as shown in FIGURE 4.

In order to make certain that the enlarged knob or head portion 54 on the actuating lugs 52, 53 of the carriers do not prematurely disengage or move out of the movable end channels 100, 132, these end channels are provided with a channel member 220 positioned on the top side of the channels 100, 132, and having short downwardly extending flanges 221 overlying the open side of the members 100, 132, see FIGURE 12. The flanges 220 are of sufficient length to maintain the heads 54 in the movable channel members during movement of the associated actuators 90, 131.

It will be apparent that if a container is already positioned on the unload platform when it is in the out position, the switch 207 will be opened and accordingly, the tabs 179, while closing switch 203, will not effect shifting of the channel member 132, and the loaded carrier will pass downwardly without causing inward movement of the already loaded platform 115.

There is a bar, not shown, mounted at the lower end of the righthand track for engagement by the tabs 179 to return all of the tabs to normal position previous to the upward flight of the carriers.

It will be obvious that the loading and unloading mechanisms, including the associated operating linkages, and the necessary control switches are all mounted on the frame module. This entire loading and unloading unit, or module, can accordingly be completely fabricated and assembled at the factory. This only requires insertion of a unit at each floor level and its attachment to the track structures, as previously described.

What we claim is:

1. A vertical conveyor system for a multi-floor building structure for the transfer of articles from one floor station to another, said conveyor system comprising a pair of laterally spaced apart vertically disposed tracks extending from each floor station to the next, sprockets journalled in the upper and lower ends of said tracks, an endless chain trained over said sprockets with the up-run of said chain extending in juxtaposition to one of said tracks, and the down-run extending in juxtaposition to the other of said tracks, power means for effecting rotation of said sprockets, carriers connected to said chain at spaced intervals therealong and having sliding engagement with said tracks for guidance thereby, each of said carriers having article engaging arms spaced apart transversely of said tracks and having an actuating lug extending in a direction laterally of each of said arms, a loading and unloading unit mounted at each floor station and comprising a frame disposed vertically medial of the up and down movements of said carriers, a loading mechanism mounted on one side of said frame in juxtaposition to the upward movement of said carriers, said loading mechanism including an article supporting load platform movable into and out of the path traveled by said upwardly moving carriers, an unloading mechanism mounted on the opposite side of said frame in juxtaposition to the downward movement of said carriers and including an article supporting unload platform movable into and out of the path traveled by said downwardly moving carriers, each of said platforms having a transverse dimension less than the spacing between the arms of said carriers, a pair of vertically spaced apart platform actuators carried by said frame and associated with each of said platforms, linkage operatively connecting the actuators of each pair together and to the associated platform, one actuator of each pair having an end portion shiftable into the path traveled by an actuating lug on a carrier approaching the floor station for engagement by said lug, electro-responsive means operable when energized to shift said actuator end portion, said first actuator and linkage being cooperable upon such engagement by said lug to move the associated platform inwardly into the path traveled by said carriers for the transfer of an article from the inwardly positioned load platform to the carrier, and the transfer of an article from the carrier to the inwardly positioned unload platform, said linkage being also operable upon such movement of said first actuator to move said second actuator in position for engagement by an actuating lug on said carrier to effect return movement of the associated platform outwardly from the path traveled by said carriers.

2. A vertical conveyor system for a multi-floor building structure for the transfer of articles from one floor station to another, said conveyor system comprising a pair of laterally spaced apart vertically disposed tracks extending from each floor station to the next, sprockets journalled in the upper and lower ends of said tracks, an endless chain trained over said sprockets with the up-run of said chain extending in juxtaposition to one of said tracks, and the down-run extending in juxtaposition to the other of said tracks, power means for effecting rotation of said sprockets, carriers connected to said chain at spaced intervals therealong and having sliding engagement with said tracks for guidance thereby, each of said carriers having article engaging arms spaced apart transversely of said tracks and having an actuating lug extending in a direction laterally of each of said arms, a loading and unloading unit mounted at each floor station and comprising a frame disposed vertically medial of the up and down movements of said carriers, a loading mechanism mounted on one side of said frame in juxtaposition to the upward movement of said carriers, said loading mechanism including an article supporting load platform movable into and out of the path traveled by said upwardly moving carriers, an unloading mechanism mounted on the opposite side of said frame in juxtaposition to the downward movement of said carriers and including an article supporting unload platform movable into and out of the path traveled by said downwardly moving carriers, each of said platforms having a transverse dimension less than the spacing between the arms of said carriers, a pair of vertically spaced apart load platform actuators carried by said frame, linkage operatively connecting the actuators of said pair together and to the load platform, one actuator of said pair having an end portion shiftable into the path traveled by an actuating lug on an upwardly moving carrier approaching the floor station, electro-responsive means operable when energized to shift said actuator end portion, said first actuator and linkage being cooperable upon engagement by said lug to move the load platform inwardly into the path traveled by said carriers for the transfer of an article from the inwardly positioned load platform to the carrier, said linkage being also operable upon such movement of said first actuator to move the second actuator of said pair in position for engagement by said lug to effect return movement of the load platform outwardly from the path traveled by said carriers, a second pair of vertically spaced apart unload platform actuators carried by said frame, linkage operatively connecting the actuators of said second pair together and to the unload platform, one actuator of said second pair having an end portion shiftable to the path traveled by an actuating lug on a descending carrier approaching the floor station, electro-responsive means operable when energized to shift the end portion of said first actuator of said second pair, said first actuator of said second pair and said linkage being cooperable upon such engagement by said lug to move the unload platform inwardly into the path traveled by said descending carrier for the transfer of an article therefrom to the inwardly positioned load platform, and the linkage connecting said second pair of actuators being also operable upon said last mentioned movement to move the second actuator of said second pair in position for engagement by said lug on said carrier to effect return movement of said unload platform outwardly from the path traveled by said carriers.

3. A vertical conveyor system as set forth in claim 2, wherein the frame of said loading and unload unit is detachably connected to said tracks.

4. A vertical conveyor system as set forth in claim 1, wherein a platform supporting pedestal is pivotally connected at one end to said frame at each side thereof, said load and unload platforms being pivotally connected to the opposite ends of said pedestals respectively, and a balancing link connected to each of said platforms and operable to maintain said platforms in horizontal position during inward and outward movement thereof.

5. A vertical conveyor system as set forth in claim 2, including a circuit for energizing said electro-responsive means, said circuit including a switch mounted on said load platform closed by an article positioned on said platform, a normally closed sensing switch opened by the presence of an article on an upwardly moving carrier, and a third switch actuated by said upwardly moving carrier, said switches being connected in series.

6. A vertical conveyor system as set forth in claim 2, and including an unload control switch mounted in a predetermined position on the frame of each loading and unloading unit, a series of tabs on each of said carriers, said tabs being individually settable for actuating the unload control switch at a selected station upon downward approach of a carrier to said station, each unload platform having a switch closed by the presence of an article on said platform, said unload control switch and said platform switch being connected in series.

7. A vertical conveyor system as set forth in claim 2, wherein said linkage connecting said actuators to said load and unload platforms includes toggle mechanism movable over center to locking position when said platforms are moved to outward position.

8. A vertical conveyor system as set forth in claim 2, wherein said linkage includes adjustable stop members for positioning said actuators in respect to the path of movement of the actuating lugs on said carriers.

References Cited by the Examiner

UNITED STATES PATENTS 1,910,965   5/1933   Regar _______________ 198—56

EVON C. BLUNK, *Primary Examiner.*

A. C. HODGSON, *Assistant Examiner.*